United States Patent
Kobayashi (10) Patent No.: US 6,860,168 B1
(45) Date of Patent: Mar. 1, 2005

(54) AUTOMATIC TRANSMISSION FOR VEHICLE

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/412,253

(22) Filed: Apr. 14, 2003

(30) Foreign Application Priority Data

Apr. 16, 2002 (JP) ........................................ 2002-113231
Apr. 16, 2002 (JP) ........................................ 2002-113232

(51) Int. Cl.$^7$ .............................. F16H 3/08; F16H 3/38
(52) U.S. Cl. .......................................... 74/331; 74/340
(58) Field of Search ............................ 74/329–31, 340; 477/88, 109

(56) References Cited

U.S. PATENT DOCUMENTS

| | | | | |
|---|---|---|---|---|
| 2,599,801 A | * | 6/1952 | Youngren et al. ............. | 74/330 |
| 2,972,899 A | * | 2/1961 | Wiggermann ................. | 74/329 |
| 4,461,188 A | * | 7/1984 | Fisher .......................... | 74/330 |
| 5,186,065 A | * | 2/1993 | Downs .......................... | 74/331 |
| 5,445,041 A | * | 8/1995 | Zaiser et al. .................. | 74/331 |
| 6,186,029 B1 | * | 2/2001 | McQuinn ...................... | 74/331 |
| 6,494,110 B2 | * | 12/2002 | Hatakeyama ................. | 74/331 |

FOREIGN PATENT DOCUMENTS

| | | |
|---|---|---|
| GB | 2159216 | 11/1985 |
| JP | 60-194648 | 12/1985 |
| JP | 60-256656 | 12/1985 |
| JP | 3-048060 | 3/1991 |
| JP | 6-221347 | 8/1994 |
| JP | 7-301302 | 11/1995 |
| JP | 8-93861 | 4/1996 |
| JP | 10-89456 | 4/1998 |
| JP | 11-264449 | 9/1999 |

OTHER PUBLICATIONS

Translation of Japanese Patent Office Actions, dated Jun. 18, 2003 (Patent Application No. 2002–113232) and Jun. 24, 2003 (Patent Application No. 2002–113231).
Translation of the claims in the Japanese Utility Model Laid–Open No. 60–194648.

* cited by examiner

Primary Examiner—Roger Pang
(74) Attorney, Agent, or Firm—Smith, Gambrell & Russell, LLP (57) ABSTRACT

An automatic transmission has concentric first and second input shafts, and a parallel output shaft. A plurality of transmission gear trains are provided between the input shafts and the output shaft. An input switching shaft is arranged in parallel with the input shafts and the output shaft, and is provided with a first friction clutch switch switches into a power transmission state and a disconnection state with respect to the first input shaft, and a second friction clutch which switches into a power transmission state and a disconnection state with respect to the second input shaft. Engine power is bypassed to the input switching shaft so as to be transmitted to the output shaft via the first friction clutch or the second friction clutch and to effectively shorten the entire length of the transmission.

18 Claims, 14 Drawing Sheets

| SPEED RANGE | FIRST FRICTION CLUTCH 31 | SECOND FRICTION CLUTCH 32 | POWER TRANSMISSION PATH |
|---|---|---|---|
| P RANGE | × | × | POWER DISCONNECTION |
| R RANGE | ○ | × | $ir=(Z_{D2}/Z_{D1}) \times (Z_{3a}/Z_{P1}) \times (Z_{R3}/Z_{1a}) \times (Z_{R2}/Z_{R1}) \times (Z_{F2}/Z_{F1})$ |
| N RANGE | × | × | POWER DISCONNECTION |
| FIRST SPEED | ○ | × | $i1=(Z_{D2}/Z_{D1}) \times (Z_{3a}/Z_{P1}) \times (Z_{1b}/Z_{1a}) \times (Z_{F2}/Z_{F1})$ |
| SECOND SPEED | × | ○ | $i2=(Z_{D2}/Z_{D1}) \times (Z_{4a}/Z_{P2}) \times (Z_{2b}/Z_{2a}) \times (Z_{F2}/Z_{F1})$ |
| THIRD SPEED | ○ | × | $i3=(Z_{D2}/Z_{D1}) \times (Z_{3a}/Z_{P1}) \times (Z_{3b}/Z_{3a}) \times (Z_{F2}/Z_{F1})$ |
| FOURTH SPEED | × | ○ | $i4=(Z_{D2}/Z_{D1}) \times (Z_{4a}/Z_{P2}) \times (Z_{4b}/Z_{4a}) \times (Z_{F2}/Z_{F1})$ |
| FIFTH SPEED | ○ | × | $i5=(Z_{D2}/Z_{D1}) \times (Z_{3a}/Z_{P1}) \times (Z_{5b}/Z_{5a}) \times (Z_{F2}/Z_{F1})$ |

AUTOMATIC TRANSMISSION FOR VEHICLE

TECHNICAL FIELD OF THE INVENTION

The present invention relates to a parallel axes type automatic transmission for a vehicle, and more particularly to an automatic transmission of a transverse Trans-axle type in which a final reduction gear unit is housed.

BACKGROUND OF THE INVENTION

The parallel axes type transmission has an input shaft provided with a plurality of drive gears; and an output shaft arranged in parallel with the input shaft and provided with a plurality of driven gears respectively engaged (or meshed) with the drive gears. In the transmission, a gear shift operation is carried out by a positive clutch to select a transmission gear train carrying out a power transmission among a plurality of transmission gear trains formed by the drive gears and the driven gears. In a manual transmission, a driver operates a shift lever, whereby the positive clutch is driven and the gear shift operation is carried out. Driving the positive clutch by a hydraulic actuator can achieve an automatic transmission having a base structure on the parallel axes type manual transmission.

Japanese Patent Application Laid-Open No. 60-256656 discloses a parallel axes type automatic transmission having such a structure that a power unit comprising an engine and a transmission is transversely arranged within an engine room (or compartment). This transmission has a drive shaft connected to a crankshaft of the engine, and two hollow input shafts which are concentrically (or coaxially) arranged in an outer side thereof and are respectively provided with a plurality of drive gears. A first friction clutch is arranged in one end portion of the drive shaft to connect one of the input shafts to the drive shaft, and a second friction clutch is arranged in the other end portion of the drive shaft to connect the other input shaft to the drive shaft. This transmission can obtain a predetermined transmission speed by selectively engaging the respective friction clutches and by switching any of the transmission gear trains into a power transmission state.

Further, Japanese Patent Application Laid-Open No. 10-89456 discloses a parallel axes type transmission provided with two friction clutches. This transmission has two input shafts which are concentrically arranged and are respectively provided with a plurality of drive gears. A friction clutch is provided between the respective one end portions of the respective input shafts and a crankshaft. The two friction clutches are switched when switching a positive clutch, and a shift operation is carried out while interlocking with a control of an electronic control throttle valve.

Further, Japanese Patent Application Laid-Open No. 11-264449 discloses a transmission which has an intermediate shaft provided with a drive gear and an output shaft provided with a driven gear, and in which a friction clutch for transmitting a rotation of a crankshaft of an engine to the intermediate shaft. A friction clutch for transmitting the rotation of the crankshaft to the output shaft via an accessory (or intermediate) axis are arranged in an extending (or a longitudinally) direction of the output shaft.

As mentioned above, when it is intended to smoothly carry out the shift operation in the automatic transmission on the basis of the mechanism of the manual transmission while interlocking the friction clutch with the positive clutch, there can be considered that two friction clutches are provided between the engine and the transmission, or in both ends of the transmission, as disclosed in the prior art mentioned above.

However, in the case that the conventional parallel axes type automatic transmission having two friction clutches are applied as the power unit in which the engine and the transmission are transversely arranged within the engine room in a forward (or front) side of a driver seat, the transmission including the friction clutches and devices for controlling an operation of the friction clutches becomes long and large. In particular, when it is intended to employ (or use) a wet type clutch in place of a dry type clutch as the friction clutch in consideration of a controllability, a durability and a reliability, a space in the periphery of the transmission and a freedom of designing the transmission itself are deteriorated, so that it is unavoidable that a whole length of the transmission is increased.

As disclosed in the respective publications mentioned above, in the transmission in which two friction clutches are provided between the engine and the transmission, or two friction clutches are arranged on an extended position of the input shaft, it is limited by the vehicle size in width to have the engine to increase a number of cylinders and the displacement, since the whole length of the transmission is increased.

Further, when the size of the transmission in the width direction becomes large, it is impossible to secure a sufficient space for a crush stroke within the engine room for a head-on or side collision, so that there is an inconvenience that it is hard to satisfy a mountability of the transmission and that an outer appearance and a packaging of the vehicle are largely affected.

Further, in the case of combining a diesel engine with the conventional transmission, it is necessary to assemble a mechanical damper in the transmission for damping a vibration of the engine, and the whole length of the transmission including the damper is increased. In particular, in the case that a torque converter is provided in the crankshaft of the engine, the whole length of the transmission including the torque converter is increased.

Since the friction clutches are arranged on the extension of the input shaft or the output shaft in the prior art as mentioned above, it is difficult to commonly use the parts of the manual transmission and production equipment (or facilities) to the full. Further, it is necessary to achieve a high functional control to increase or reduce an oil pressure for a delicate control of a starting clutch in order for smooth start of the vehicle or for carrying out a smooth gear shift without a shift shock. And the common use between the manual transmission and the automatic transmission must be abandoned (or sacrificed) in order to secure a high productivity.

SUMMARY OF THE INVENTION

An object of the present invention is to provide an automatic transmission for a vehicle in which a size in an axial direction can be shortened.

Another object of the present invention is to provide the automatic transmission for the vehicle which is transversely arranged within an engine room.

The other object of the present invention is to provide the automatic transmission for the vehicle which has a damper for damping an engine vibration.

The other object of the present invention is to provide the automatic transmission for the vehicle which has a torque converter and can be shortened in a whole length.

The automatic transmission for the vehicle according to the present invention comprises: a first input shaft provided with a plurality of drive gears; a second input shaft concentrically connected to the first input shaft so as to freely rotate and provided with a plurality of drive gears; an output shaft arranged in parallel with each of the input shafts and provided with a plurality of driven gears constantly engaging with the drive gears so as to respectively form transmission gear trains, a plurality of positive clutches for switching the plurality of transmission gear trains between a power transmission state and a disconnection state; an input switching shaft arranged in parallel with each of the input shafts and the output shaft; a first friction engagement element provided on the input switching shaft to changeover between a transmitting state of the power to the first input shaft and a disconnecting state of the power; and a second friction engagement element provided on the input switching shaft for switching between the transmitting state and the disconnecting state of the power, wherein the engine power is bypassed to the input switching shaft such that the engine power is transmitted to the output shaft via the first friction engagement element or the second friction engagement element.

The automatic transmission for the vehicle according to the present invention further comprises a damper arranged between the crankshaft and the input switching shaft for damping an engine vibration and transmitting the engine power to the input switching shaft.

The automatic transmission for the vehicle according to the present invention further comprises a torque converter having an input portion connected to the crankshaft and an output portion of the input switching shaft and arranged between the crankshaft and the input switching shaft.

In the automatic transmission for the vehicle according to the present invention, the torque converter has a lockup clutch for connecting between the input portion and the output portion and is connected and disconnected for interlocking with an engagement of each of the friction clutches.

The automatic transmission for the vehicle according to the present invention further comprises a drive gear shaft mounted on an output portion of the damper and is arranged on an extension of the first and second input shafts; and a drive side input gear mounted on the drive gear shaft for engaging with a driven side input gear mounted on the input switching shaft.

The automatic transmission for the vehicle according to the present invention further comprises the drive gear shaft mounted on the torque converter output portion and is arranged on the extension of the first and second input shafts; and the drive side input gear mounted on the drive gear shaft and engaging with a driven side input gear mounted on the input switching shaft.

The automatic transmission for the vehicle according to the present invention further comprises: a first switching gear rotatably provided to the input switching shaft and connected to an output portion of the first friction engagement element and engaged with a drive gear provided in the first input shaft; and a second switching gear rotatably provided on the input switching shaft and connected to the output portion of the second friction engagement element and engaged with the drive gear provided in the second input shaft.

In the automatic transmission for the vehicle according to the present invention, the first and second friction engagement elements are provided between the first switching gear and the second switching gear.

In the automatic transmission for the vehicle according to the present invention, the first and second friction engagement elements are provided in an end portion of the input switching shaft so as to be positioned in an outer side of the first switching gear and the second switching gear.

The automatic transmission for the vehicle according to the present invention further comprises a plurality of drive gears provided in the first input shaft and constituted by shift gear trains of one of odd and even transmission speed ranges; and a plurality of drive gears provided in the second input shaft for constituting by shift gear trains of the other of the odd and even transmission speed ranges.

The automatic transmission for the vehicle according to the present invention further comprises a hydraulic pump provided with a drive side rotor and a driven side rotor and arranged in an end portion of the transmission; and a pump drive shaft which connects the crankshaft to the drive side rotor through inner portions of the first and second input shafts.

In the automatic transmission for the vehicle according to the present invention, the hydraulic pump is provided to the transmission case; and a fluid discharged from the hydraulic pump is supplied to a hydraulic equipment such as the torque converter and the friction clutch.

The automatic transmission for the vehicle according to the present invention further comprises an electronic control throttle for adjusting an amount of an intake air of the engine so as to synchronously control the engine speed to an output shaft speed.

The automatic transmission for the vehicle according to the present invention further comprises: a first reverse drive gear rotatably provided on the input switching shaft; a reverse driven gear provided on the output shaft so as to be engaged with the first reverse drive gear; a second reverse drive gear rotatably provided on the input switching shaft so as to be engaged with a drive gear on one of the first and second input shafts; and a reverse clutch for switching the first reverse drive gear and the second reverse drive gear to a connection state and a disconnection state.

The automatic transmission for the vehicle according to the present invention further comprises: a reverse drive gear mounted on one of the first and second input shafts; a reverse driven gear provided on the output shaft so as to integrally rotate; an idler gear for switching and moving to a state of engaging with the reverse drive gear and the reverse driven gear and a state of disengaging therewith; and a reverse clutch for switching and moving the idler gear.

In the automatic transmission for the vehicle according to the present invention, the engine power is set in the state of transmitting the engine power to the reverse driven gear via the idler gear; and any one of the two friction engagement elements is set in the power transmitting state for a predetermined time so as to changeover to a reverse range.

In the automatic transmission for the vehicle according to the present invention, each of the friction engagement elements transmits the engine power to the output shaft, while gradually changing an engagement force therebetween in accordance with an accelerator opening degree and while sliding therewith in order to start the vehicle and to increase the engagement force therebetween at a predetermined vehicle speed or engine speed so as to directly connect to the output shaft.

In the automatic transmission for the vehicle according to the present invention, the output shaft and the elements assembled thereto are commonly used with a manual transmission.

The automatic transmission for the vehicle according to the present invention has first and second concentric input shafts which are respectively provided with a plurality of drive gears, an output shaft which is provided with the driven gear engaging with the drive gears, and the input switching shaft which is arranged in parallel to the input shafts and the output shaft. Since the engine power is transmitted to the input switching shaft via the damper or the torque converter, and the engine power is transmitted to the input shafts from the input switching shaft, it is possible to shorten the whole length of the transmission including the damper or the torque converter. A plurality of clutches are provided between the input switching shaft and the input shafts, and it is possible to carry out the shift operation while transmitting the engine torque to the output shaft, by transmitting the engine power to the input shafts via any friction clutches. Since the whole length of the automatic transmission can be made the same size as that of the manual transmission, it is possible to use the parts (or components) such as the transmission case, the transmission gear train, the output shaft and the like constituting the automatic transmission as the parts for the manual transmission.

DESCRIPTION OF THE PREFERRED EMBODIMENTS

Figure 1:
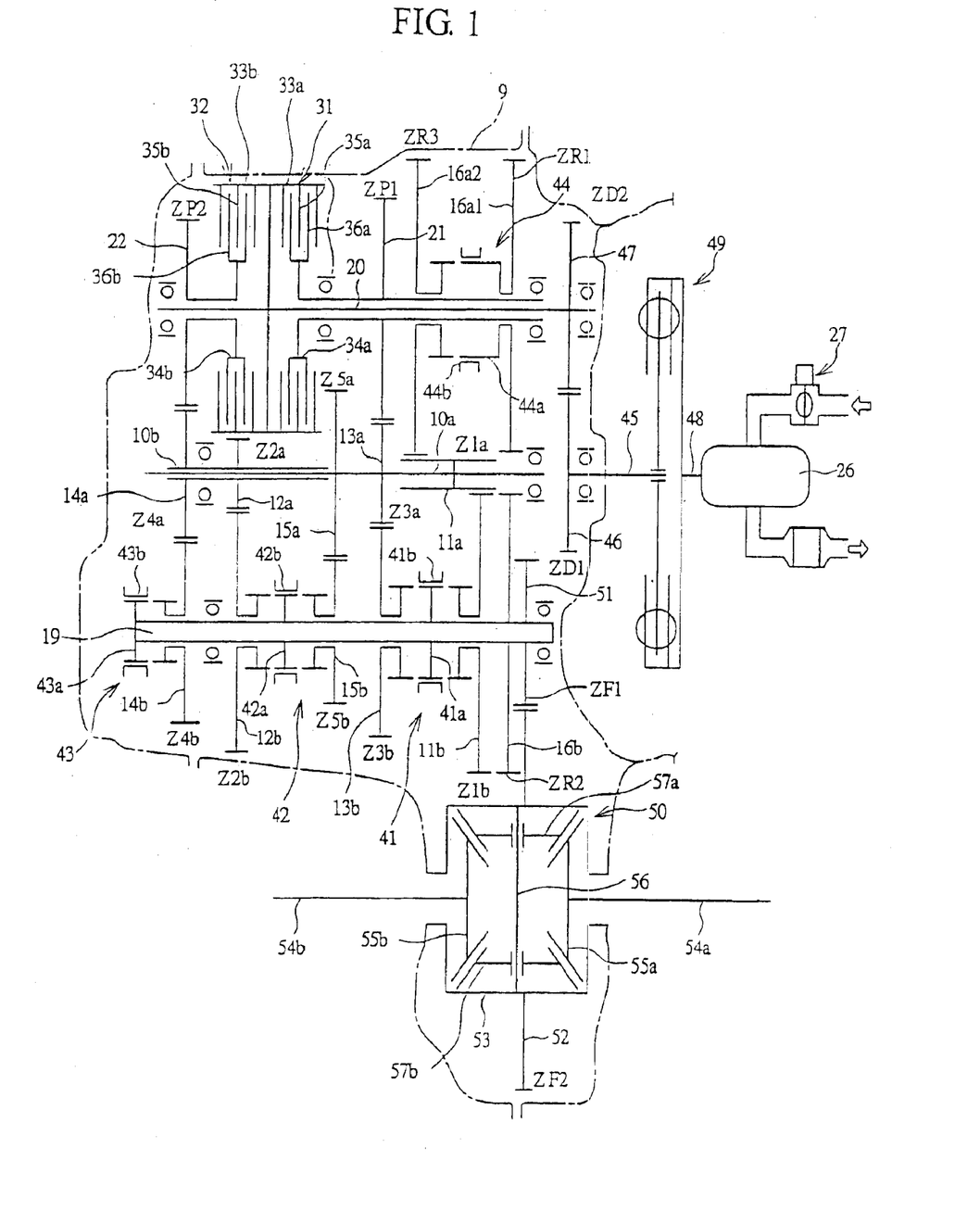
FIG. 1 is a skeleton view showing an automatic transmission for a vehicle in accordance with one embodiment of the present invention.
Figure 2:
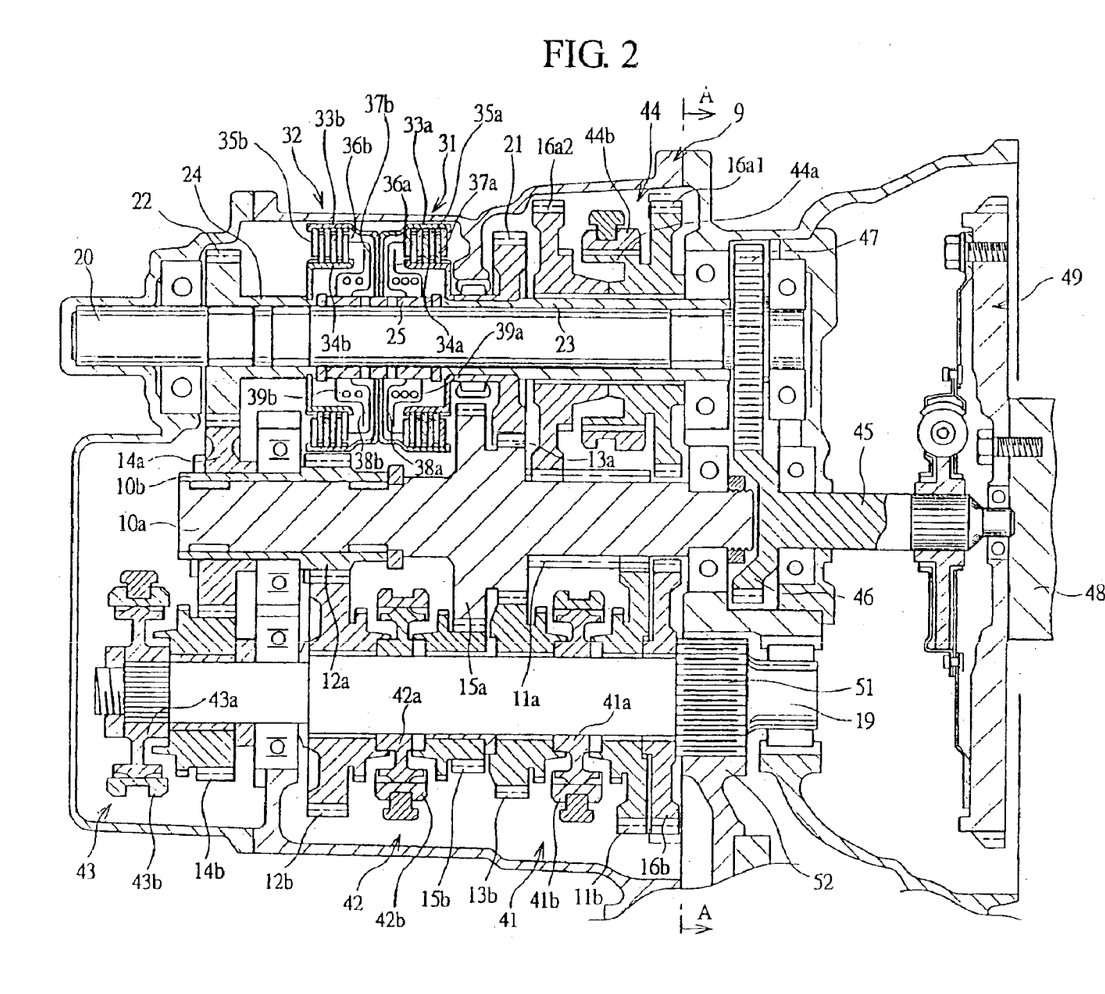
FIG. 2 shows a part of the automatic transmission in FIG. 1, and is a cross sectional view of the part along a line B—B in FIG. 3.
Figure 3:
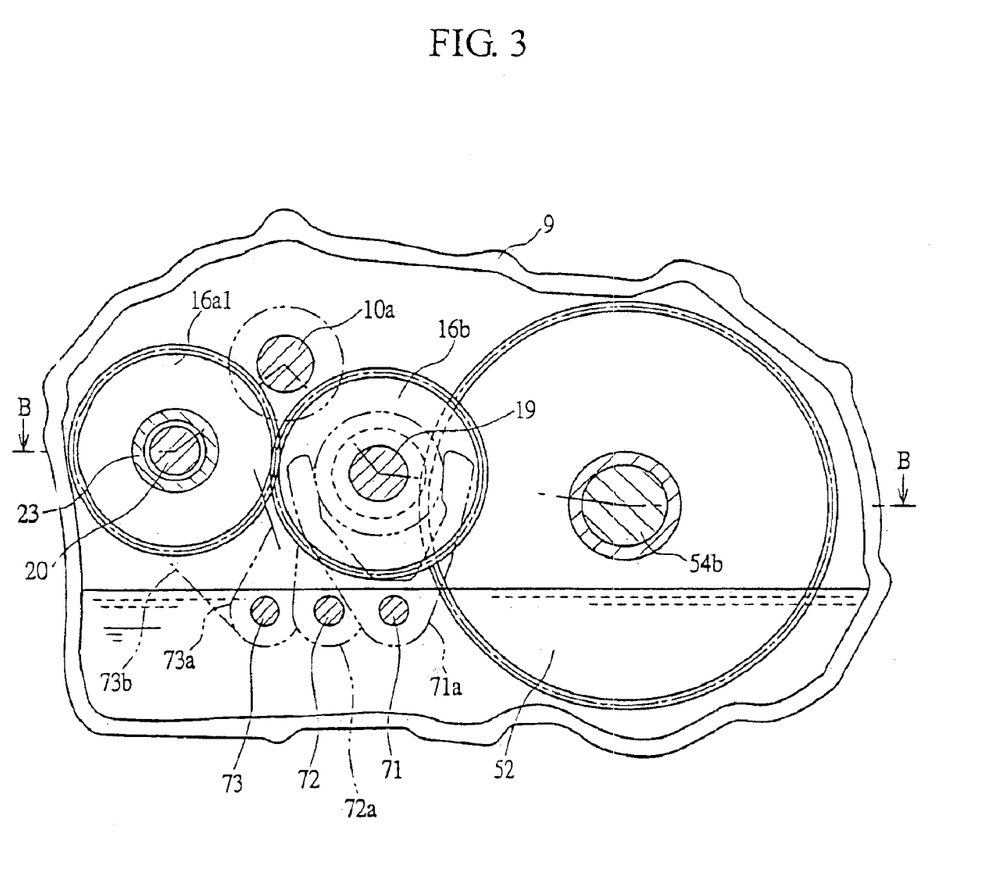
FIG. 3 is a cross sectional view in a direction along a line A—A in FIG. 2.
Figure 4:
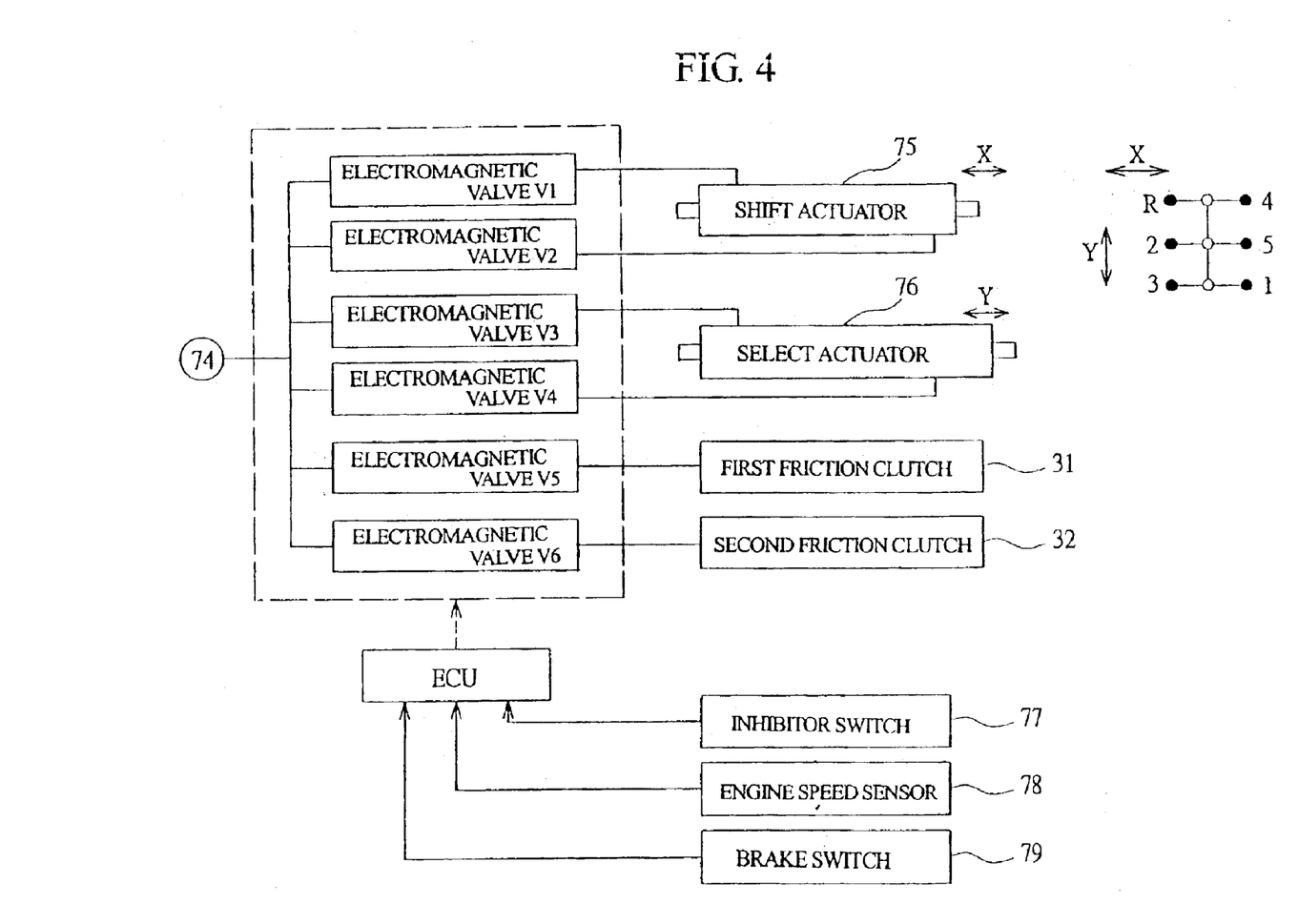
FIG. 4 is a schematic view showing a hydraulic control apparatus for controlling an operation of the automatic transmission.
Figure 5:
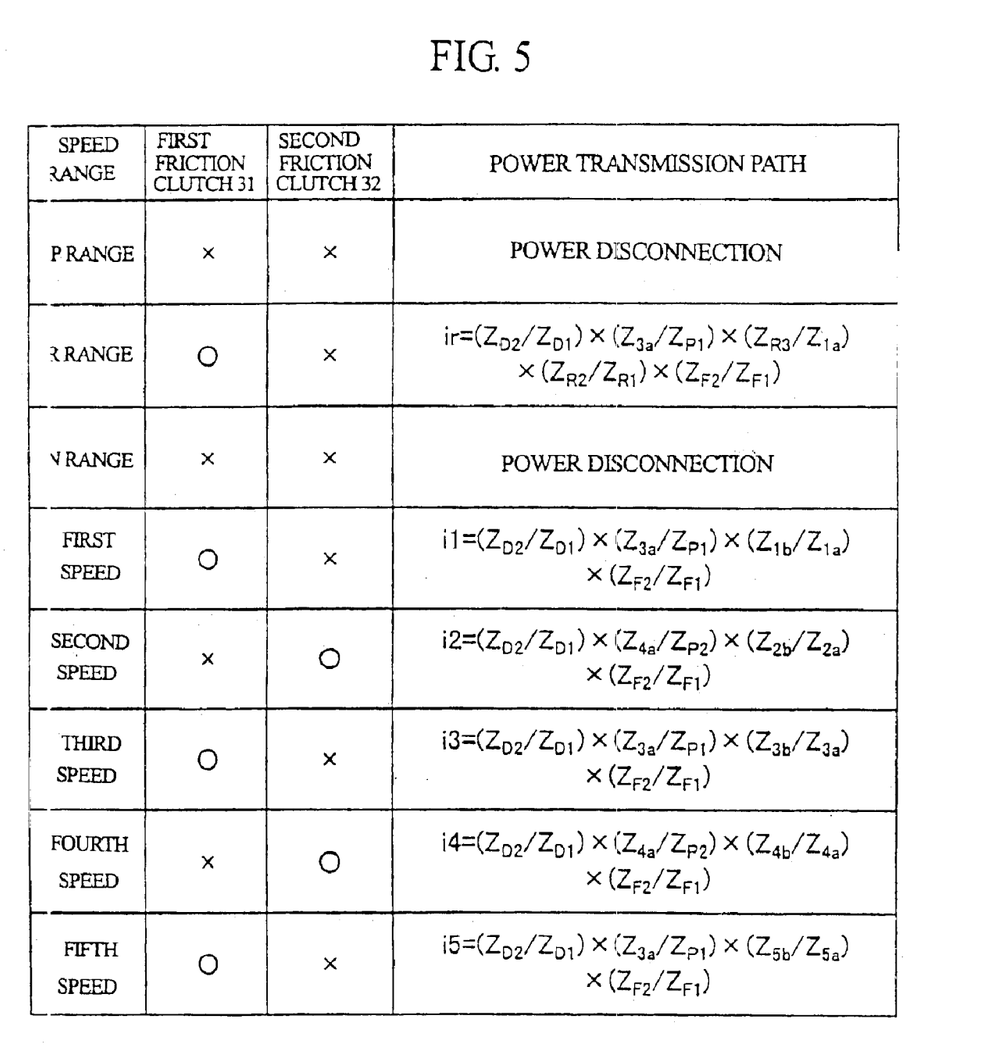
FIG. 5 is a table of a power transmission showing an engagement state between two friction clutches in each of shift ranges and a gear ratio.
Figure 6:
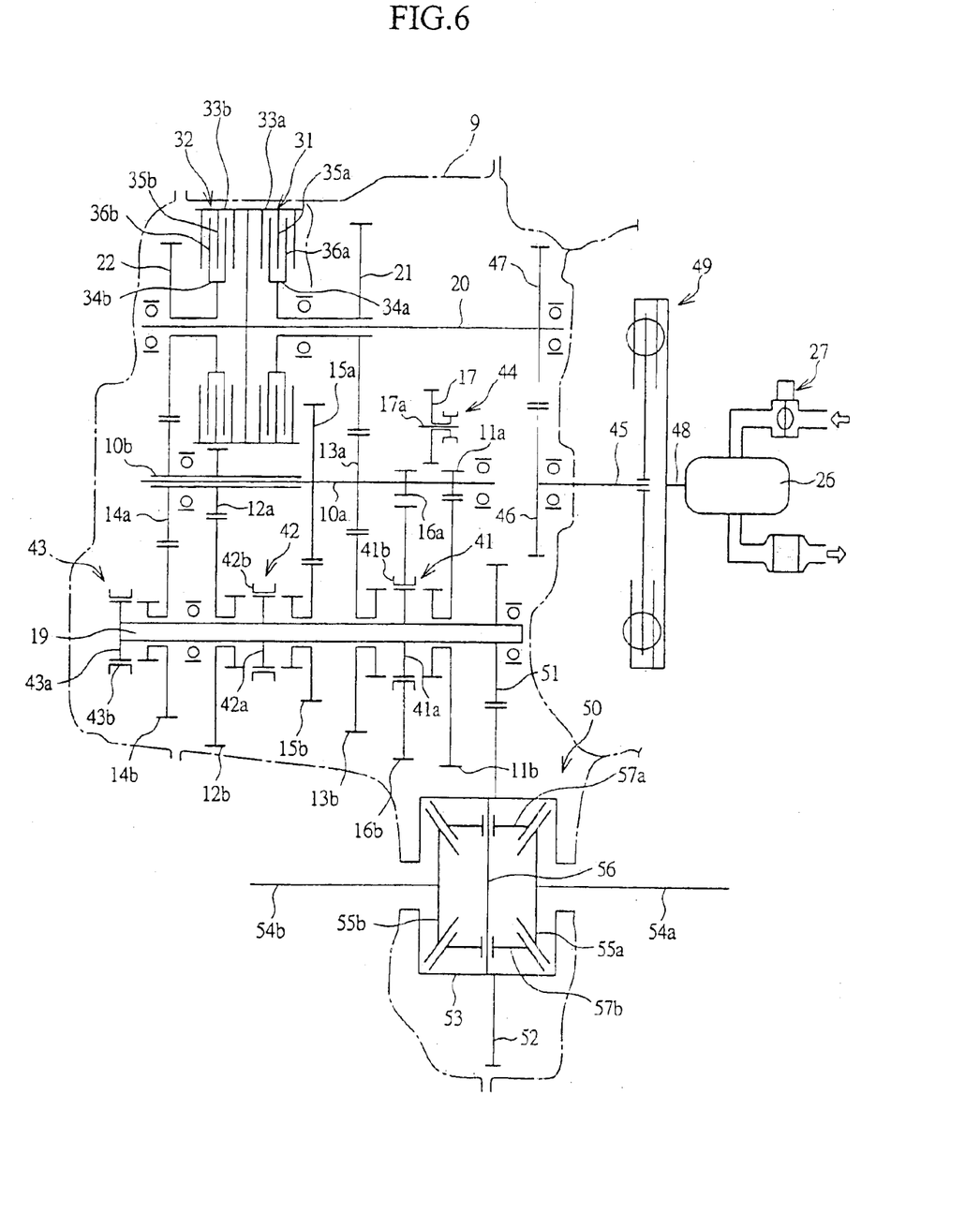
FIG. 6 is the skeleton view showing the automatic transmission in accordance with another embodiment of the present invention.
Figure 7:
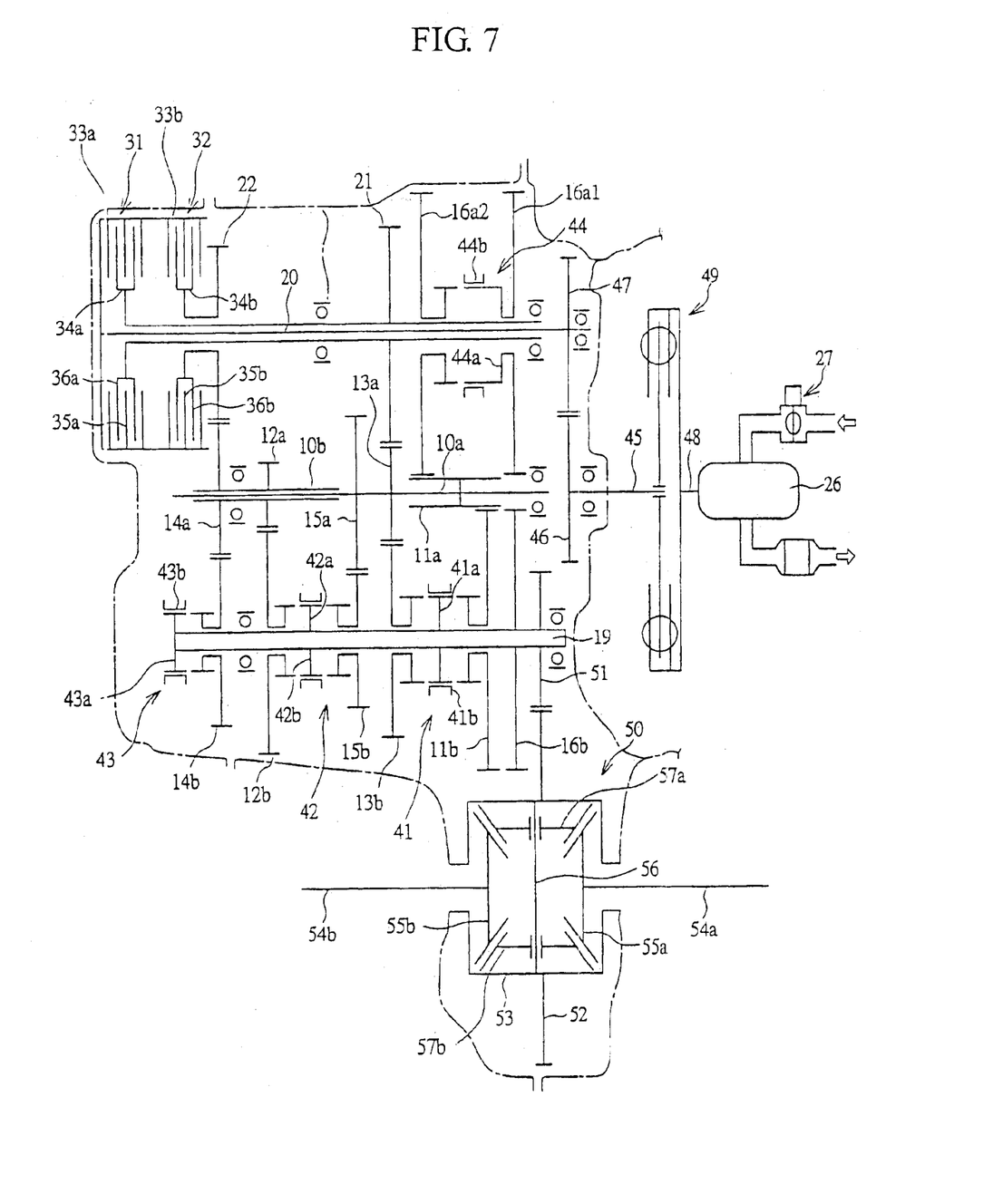
FIG. 7 is the skeleton view showing the automatic transmission in accordance with the other embodiment of the present invention.
Figure 8:
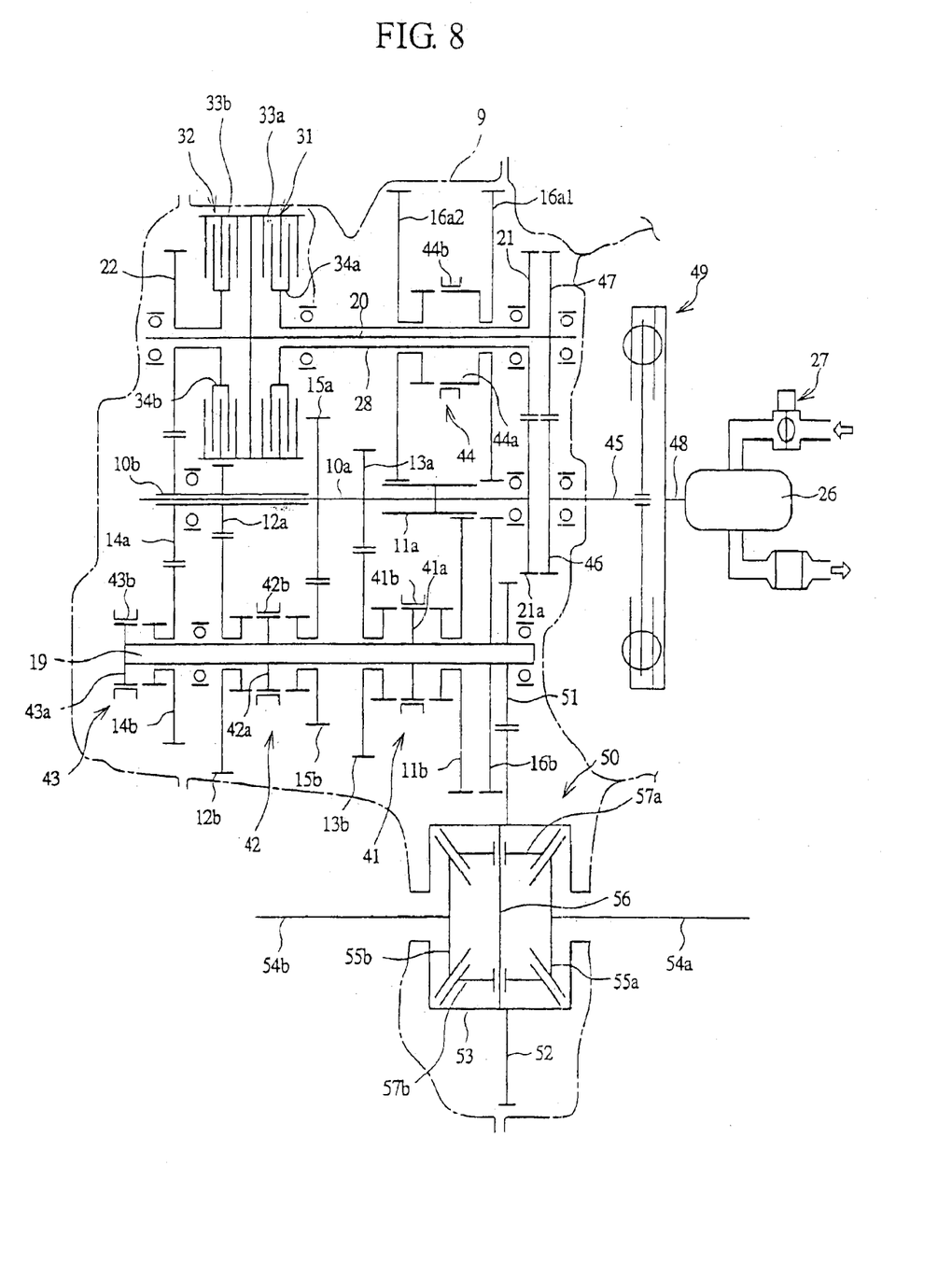
FIG. 8 is the skeleton view showing the automatic transmission in accordance with the other embodiment of the present invention.
Figure 9:
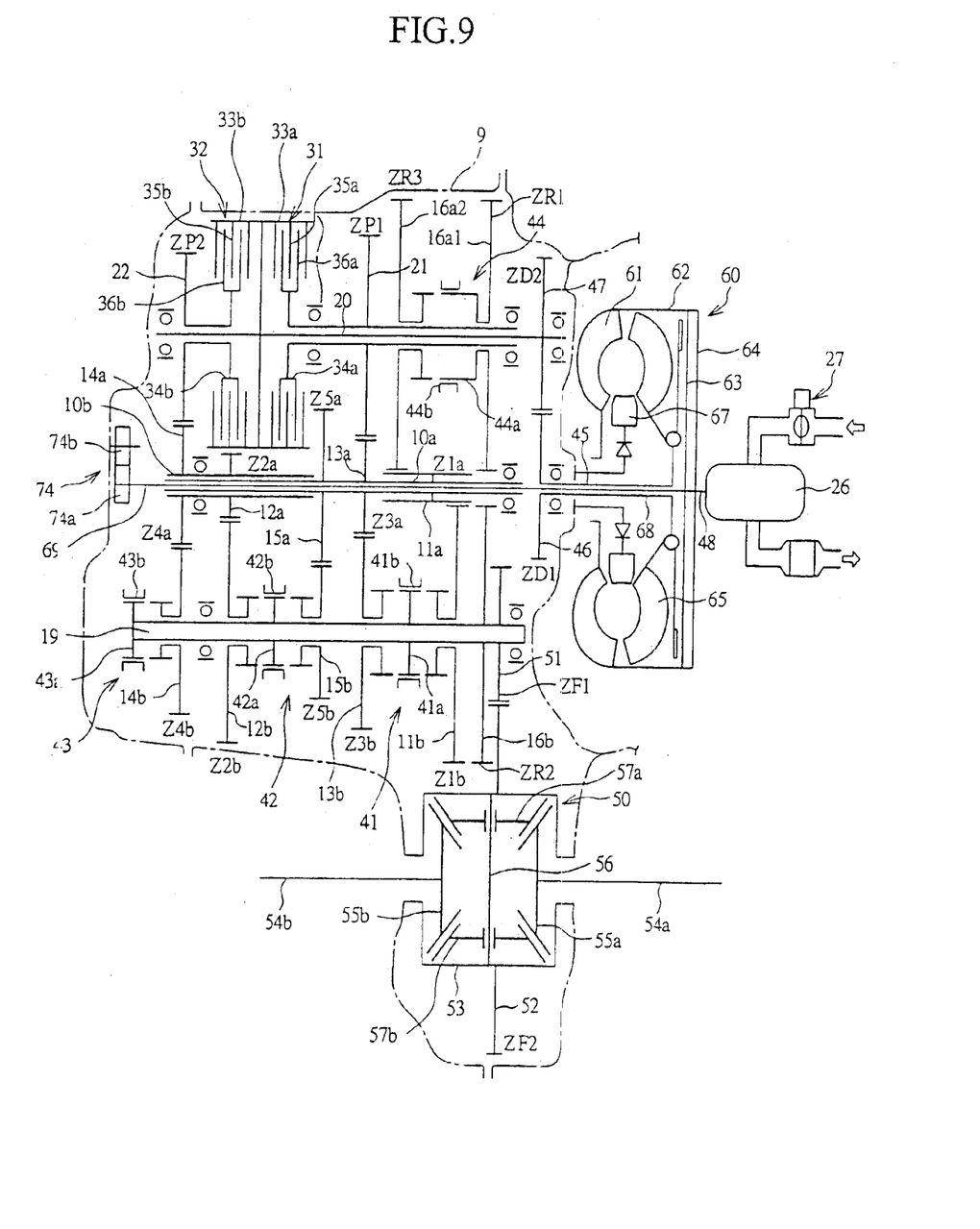
FIG. 9 is the skeleton view showing the automatic transmission in accordance with the other embodiment of the present invention.
Figure 10:
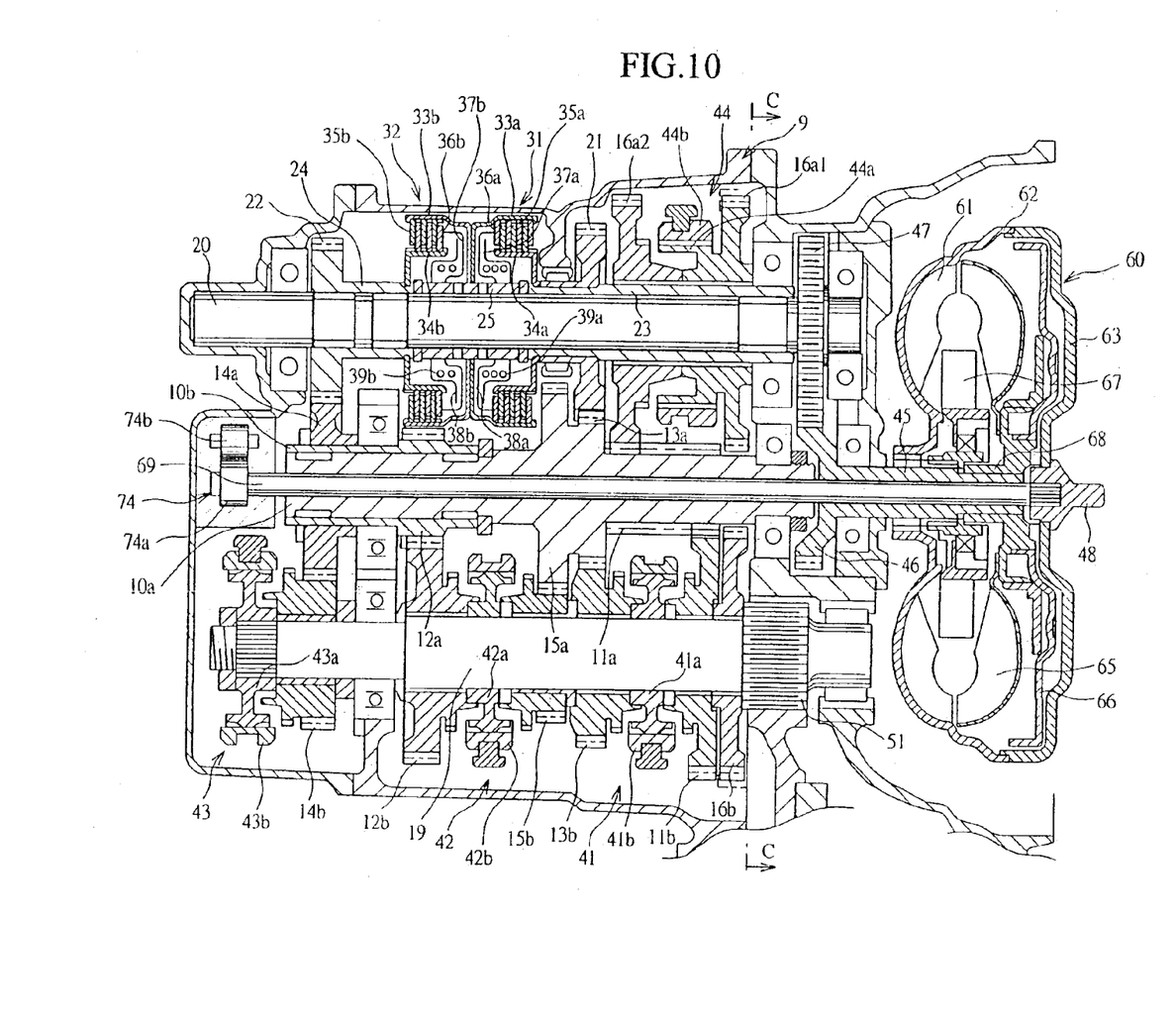
FIG. 10 shows a part of the automatic transmission in FIG. 9, and is the cross sectional view of the part along the line D—D in FIG. 11.
Figure 11:
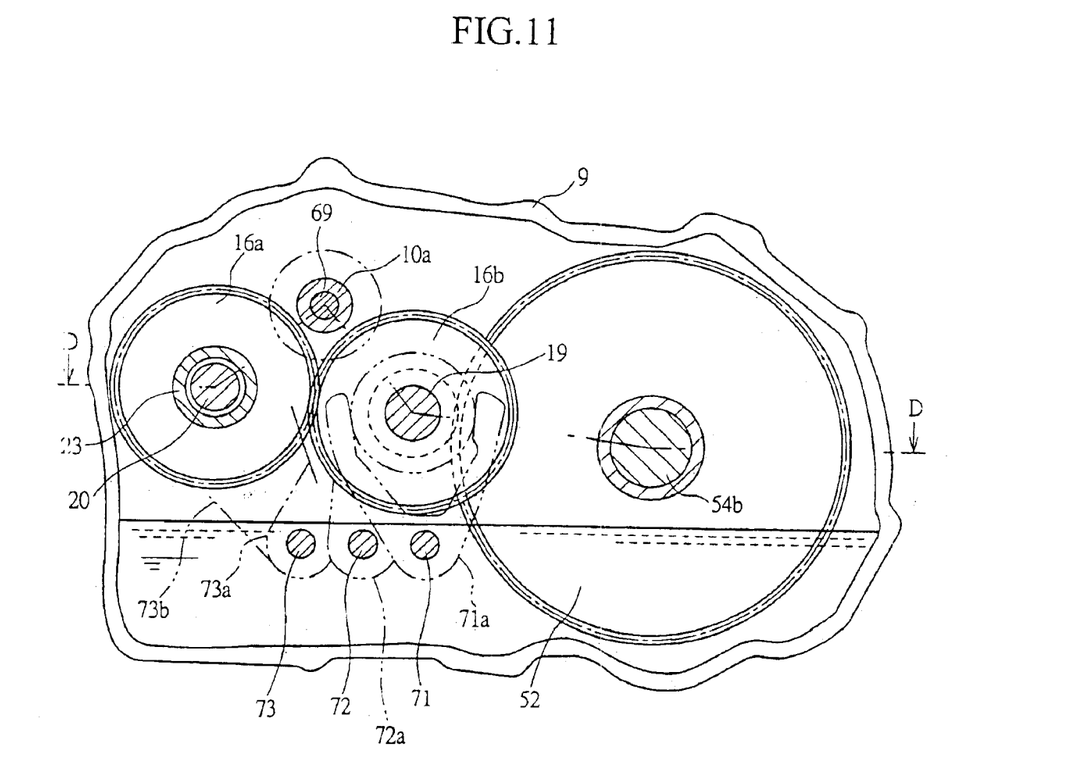
FIG. 11 is the cross sectional view in a direction along the line C—C in FIG. 10.
Figure 12:
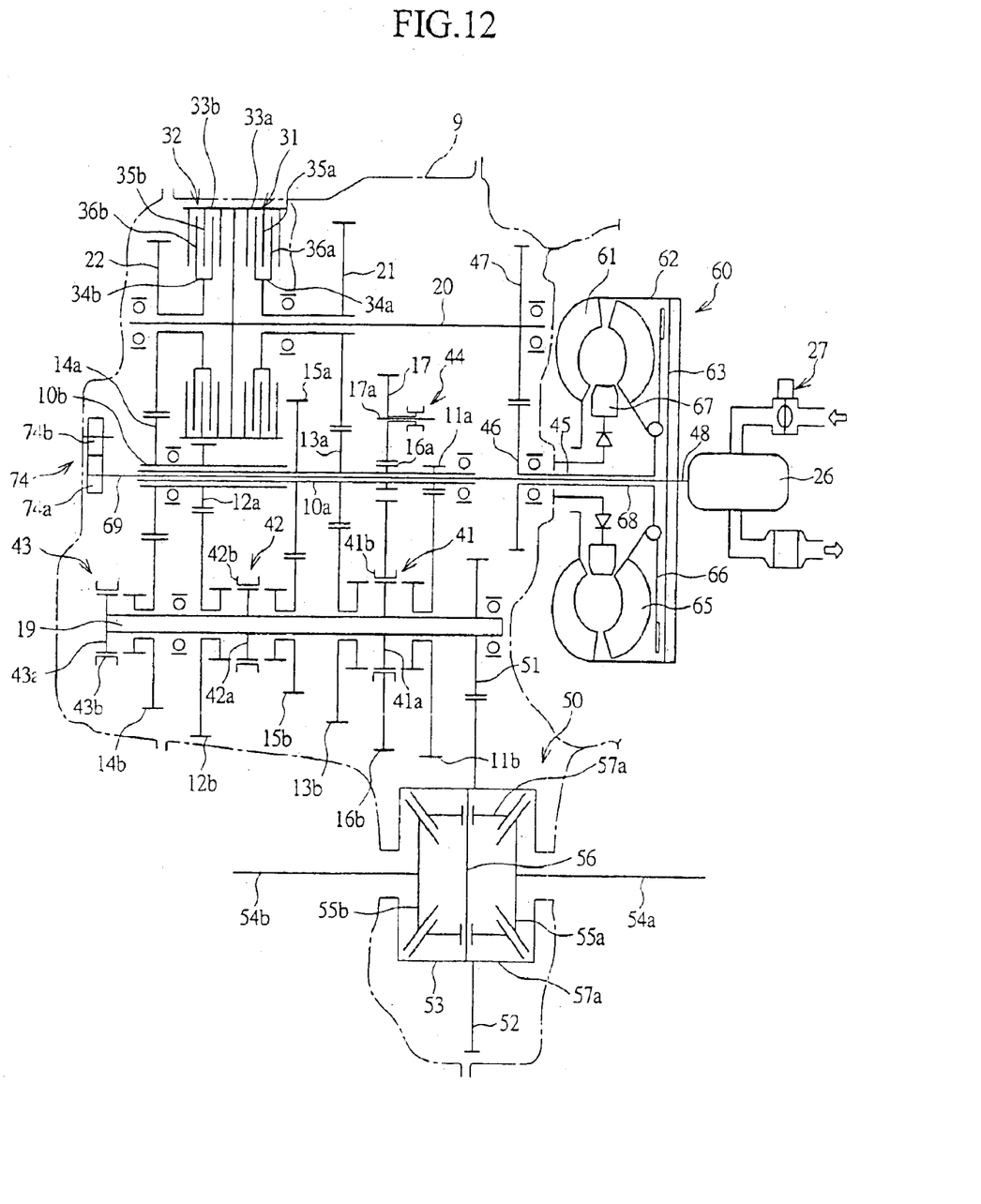
FIG. 12 is the skeleton view showing the automatic transmission in accordance with the other embodiment of the present invention.
Figure 13:
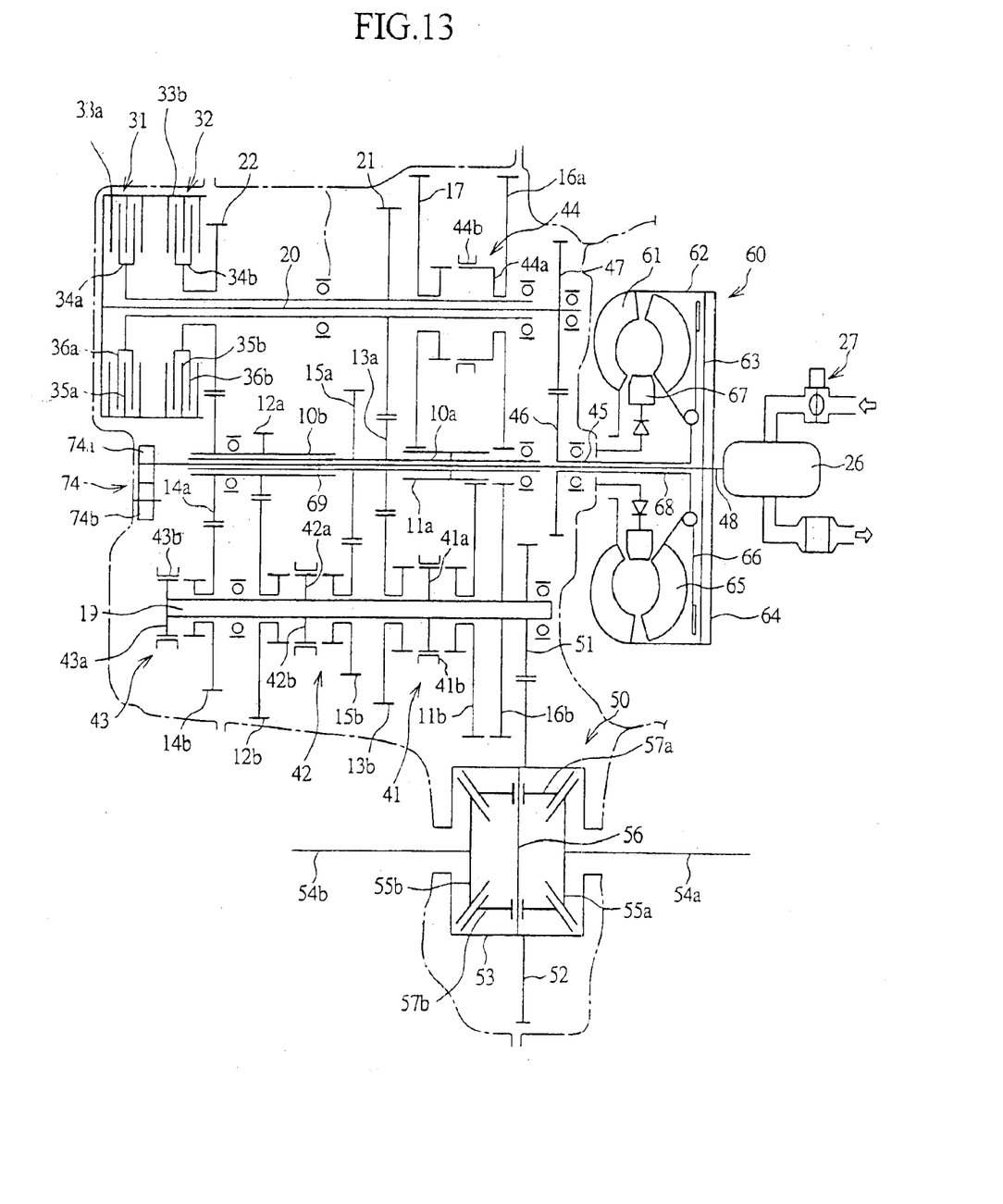
FIG. 13 is the skeleton view showing the automatic transmission in accordance with the other embodiment of the present invention.
Figure 14:
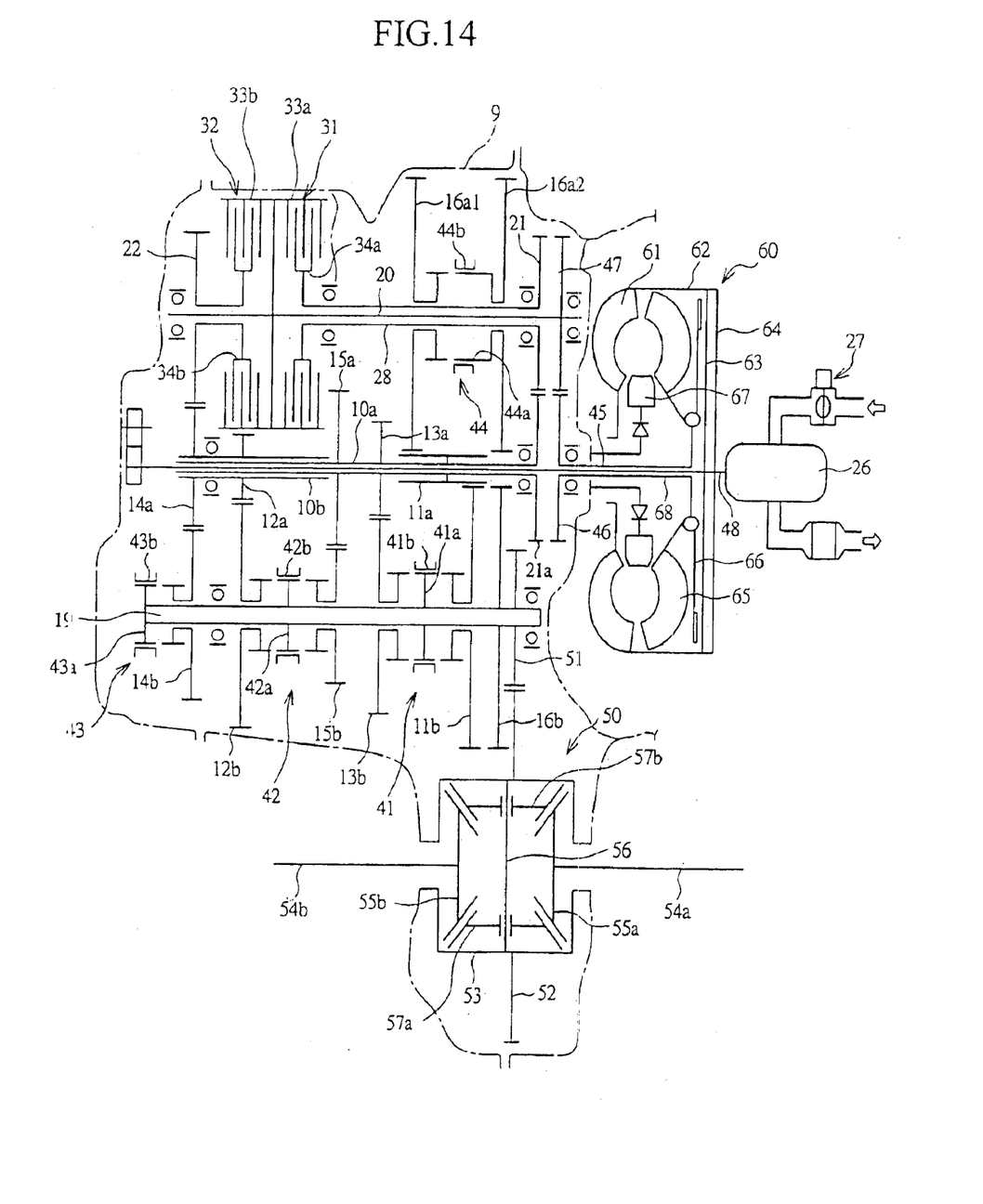
FIG. 14 is the skeleton view showing the automatic transmission in accordance with the other embodiment of the present invention.

As shown in FIGS. 1 and 2, a first input shaft 10a is rotatably provided within a transmission case 9, a hollow second input shaft 10b is rotatably provided in an end portion of the first input shaft 10a via a needle bearing, and two inputs shafts 10a and 10b are concentrically arranged. The first input shaft 10a is integrally provided with a first speed drive gear 11a, a third speed drive gear 13a and a fifth

What is claimed is:

1. An automatic transmission for a vehicle, comprising:
   a first input shaft provided with a plurality of drive gears;
   a second input shaft concentrically provided in said first input shaft so as to freely rotate and provided with a plurality of drive gears;
   an output shaft arranged in parallel with each of said input shafts and provided with the plurality of driven gears constantly engaging with said drive gears so as to respectively form transmission gear trains,
   a plurality of clutches for switching said plurality of transmission gear trains between a power transmission state and a disconnection state;
   an input switching shaft arranged in parallel with each of said input shafts and said output shaft;
   a first friction engagement element provided in said input switching shaft for switching between a state of transmitting the power to said first input shaft and the state of disconnecting the power; and
   a second friction engagement element provided to said input switching shaft and switching between a state of transmitting the power to said second input shaft and the state of disconnecting the power,
   wherein the engine power is bypassed to said input switching shaft such that the engine power is transmitted to said output shaft via said first friction engagement element or said second friction engagement element.

2. The automatic transmission according to claim 1, further comprising:
   a damper arranged between said crankshaft and said input switching shaft for damping an engine vibration and for transmitting the engine power to said input switching shaft.

3. The automatic transmission according to claim 1, further comprising:
   a torque converter having an input portion connected to said crankshaft and an output portion of said input switching shaft and arranged between said crankshaft and said input switching shaft.

4. The automatic transmission according to claim 3, wherein:
   said torque converter has a lockup clutch for connecting between said input portion and said output portion and is connected and disconnected for interlocking with an engagement of each of said friction clutches.

5. The automatic transmission according to claim 2, further comprising:
   a drive gear shaft mounted on an output portion of said damper and arranged on an extension of said first and second input shafts; and a drive side input gear mounted on said drive gear shaft for engaging with a driven side input gear mounted on said input switching shaft.

6. The automatic transmission according to claim 3, further comprising:

a drive gear shaft mounted on said torque converter output portion arranged on an extension of said first and second input shafts; and a drive side input gear mounted on said drive gear shaft for engaging with a driven side input gear mounted on said input switching shaft.

7. The automatic transmission according to claim 1, further comprising:

a first switching gear rotatably provided on said input switching shaft and connected to an output portion of said first friction engagement element for engaging with a drive gear provided in said first input shaft; and a second switching gear rotatably provided on said input switching shaft and connected to an output portion of said second friction engagement element for engaging with a drive gear provided in said second input shaft.

8. The automatic transmission according to claim 7, wherein:

said first and second friction engagement elements are provided between said first switching gear and said second switching gear.

9. The automatic transmission according to claim 7, wherein:

said first and second friction engagement elements are provided in an end portion of said input switching shaft so as to be positioned in an outer side of said first switching gear and said second switching gear.

10. The automatic transmission according to claim 1, further comprising:

a plurality of drive gears provided in said first input shaft and constituted by shift gear trains of one of odd and even transmission speed ranges; and a plurality of drive gears provided in said second input shaft for constituting by shift gear trains of the other of odd and even transmission speed ranges.

11. The automatic transmission according to claim 1, further comprising:

a hydraulic pump provided with a drive side rotor and a driven side rotor and arranged in an end portion of the transmission; and a pump drive shaft connecting said crankshaft with said drive side rotor through inner portions of said first and second input shafts.

12. The automatic transmission according to claim 11, wherein:

said hydraulic pump is provided to the transmission case; and the fluid discharged from said hydraulic pump is supplied to a hydraulic working equipment such as a torque converter and a friction clutch.

13. The automatic transmission according to claim 1, further comprising:

an electronic control throttle for adjusting an amount of intake air of the engine so as to synchronously control the engine revolution speed to an output shaft revolution speed.

14. The automatic transmission according to claim 1, further comprising:

a first reverse drive gear rotatably provided on said input switching shaft;

a reverse driven gear provided on said output shaft so as to be engaged with said first reverse drive gear;

a second reverse drive gear rotatably provided on said input switching shaft so as to be engaged with a drive gear and provided to one of said first and second input shafts; and a reverse clutch for switching said first reverse drive gear and said second reverse drive gear to a connection state and a disconnection state.

15. The automatic transmission according to claim 1, further comprising:

a reverse drive gear mounted on one of said first and second input shafts;

a reverse driven gear provided on said output shaft so as to integrally rotate;

an idler gear for switching and moving to a state of engaging with said reverse drive gear and said reverse driven gear and a state of disengaging therewith; and a reverse clutch for switching and moving the idler gear.

16. The automatic transmission according to claim 15, wherein:

the engine power is set in a state of transmitting the engine power to said reverse driven gear via said idler gear; and any one of said two friction engagement elements is set in a power transmitting state for a predetermined time so as to switch into a reverse range.

17. The automatic transmission according to claim 1, wherein:

each of said friction engagement elements transmits the engine power to said output shaft while gradually changing an engagement force therebetween in accordance with an accelerator opening degree and while sliding therewith in order to start the vehicle and increases the engagement force therebetween at a predetermined vehicle speed or engine speed so as to directly connect to said output shaft.

18. The automatic transmission according to claim 1, wherein:

said output shaft and the parts assembled thereto are commonly used with a manual transmission.

* * * * *